United States Patent [19]

Schlangen

[11] 4,061,126

[45] Dec. 6, 1977

[54] CERAMIC TILE CUTTING APPARATUS

[76] Inventor: Ronald F. Schlangen, R.R. No. 1, Richmond, Minn. 56368

[21] Appl. No.: 738,250

[22] Filed: Nov. 2, 1976

[51] Int. Cl.$^2$ ............................................. B28D 1/08
[52] U.S. Cl. ................................... 125/21; 51/135 R
[58] Field of Search ................. 125/12, 21; 51/135 R; 83/100

[56] References Cited

U.S. PATENT DOCUMENTS

| 806,928 | 12/1905 | Simmons | 51/135 R |
| 2,527,003 | 10/1950 | Emmons | 51/135 R |
| 3,452,734 | 7/1969 | Cleland | 125/21 |

FOREIGN PATENT DOCUMENTS 442,692  2/1936  United Kingdom .............. 51/135 R Primary Examiner—Harold D. Whitehead
Attorney, Agent, or Firm—Robert D. Farkas

[57] ABSTRACT

A ceramic tile cutting apparatus utilizes a motor driven blower device to collect ceramic dust into a container providing vertical support to the cutting apparatus. A drawer is employed to collect the dust and may be slideably disengaged passing through a drawer accommodating opening in in the container. The motor and blower assembly is secured to the container covering an opening therein. A filter is removably disposed intermediate a housing containing the motor and blower assembly and the opening in the container. The container is spaced above a resting surface by resilient rubber-like feet preventing vibration and noise. An opening in the container communicates to a portion of a circular cross-sectioned blade, having a silicon carbide covering, passing dust particles to within the container maintained at a pressure level lower than atmospheric, by the rotation of the blower assembly.

6 Claims, 2 Drawing Figures

CERAMIC TILE CUTTING APPARATUS

BACKGROUND OF THE INVENTION

1. The Field of the Invention

This invention relates to cutting apparatus and more particularly to that class of devices utilizing endless blades provided with vacuum operated dust collecting systems.

2. Description of the Prior Art

The prior art abounds with cutting devices to which vacuum operated dust collecting systems are attached.

SUMMARY OF THE INVENTION

A primary object of the present invention is to provide a compact band saw ceramic tile cutting device which substantially collects all of the dust created during the cutting process.

Another object of the present invention is to provide a lightweight ceramic tile cutting device which operates with a minimum of noise, vibration, and ability to slide upon a supporting surface.

Still another object of the present invention is to provide a dust collecting system which may be easily and conveniently emptied.

Yet another object of the present invention is to provide a cutting apparatus which utilizes a circular cross-sectional endless blade so as to enable the user to cut tiles in any desired shape or pattern.

Artisans engaged in the installation of ceramic tile are exposed to the abrasive dust particles released when cutting the tiles. The present invention recognizes the need to conveniently and effectively trap the dust particles and to provide a cutting apparatus which may be utilized to obtain various shapes and patterns when cutting the tiles. Since such an apparatus is carried from location to location, a permanent installation of the device being impossible, rubber-like feet are provided to minimize noise, vibration, and sliding on the surface upon which the machine is supported.

The machine can be provided with roller guides for the blade, a removable fence which may be employed guiding the tiles and a low speed motor operating the pulleys or wheels carrying the blade. The apparatus may also be employed in cutting wood, metal or other non-ceramic materials.

These objects as well as other objects of the present invention will become more readily apparent after reading the following description of the accompanying drawings.

DESCRIPTION OF THE PREFERRED EMBODIMENT

The structure and method of fabrication of the present invention is applicable to a substantially conventionally designed band saw having a housing substantially covering the pulleys and blade portions of the apparatus. The motor operating the band saw and the band saw including the housing covering it, are disposed mounted on a rectangular box shaped container having a drawer disposed slideably therewithin. Dust accumulated in the drawer may be emptied therefrom when the drawer is withdrawn through an opening in the container. Another opening in the container communicates to the housing shrouding the band saw so as to withdraw dust produced during the cutting process from the silicon carbide covered circular cross-sectioned blade into the container. A vacuum producing system consisting of a motor and blower blade assembly is contained within a housing and is fastened to the same upper surface utilized to support the cutting apparatus. A filter covers an opening in the housing which prevents dust from communicating with the blade assembly and motor within the housing. The filter is slideably engaged into the housing, covering the adjacent opening and may be removed therefrom for cleaning or replacement purposes. The container is provided with rubber-like feet attached to a lower surface preventing sliding upon the supporting surface or excessive noise or vibrations.

Figure 1:
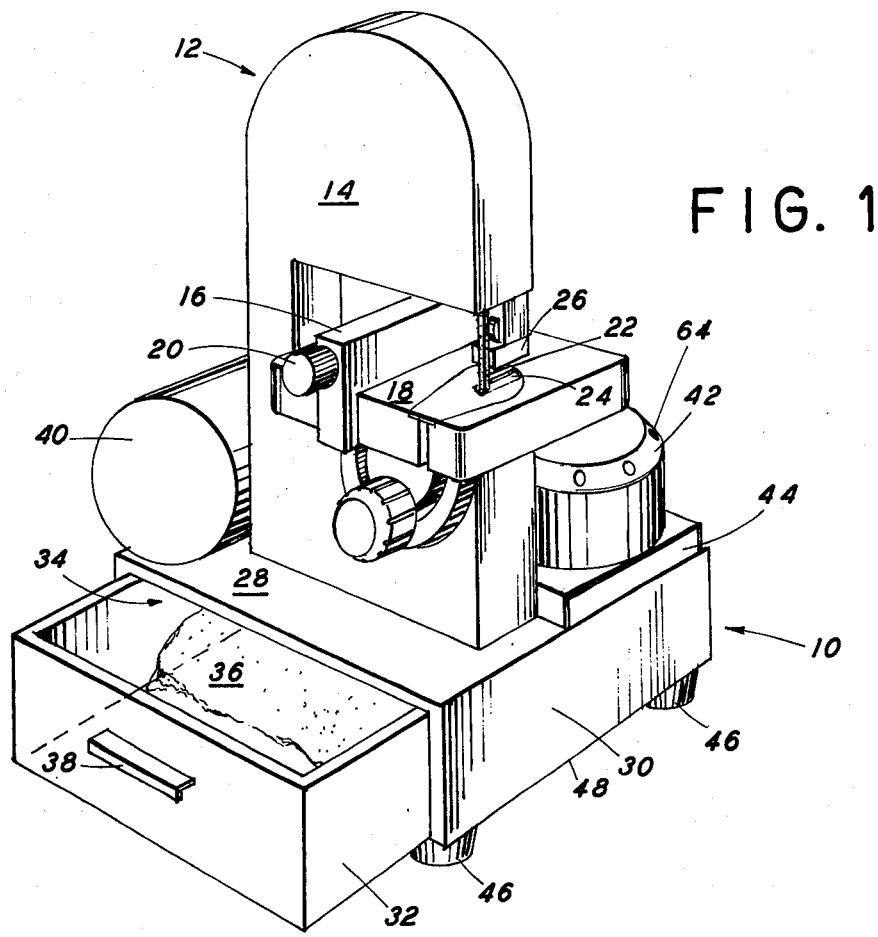
FIG. 1 is a perspective view of the present invention.

Now referring to the figures and more particularly to the embodiment illustrated in FIG. 1 showing the present invention 10 comprising a band saw apparatus 12 shrouded in part by a cover 14. Fence 16 may be adjustably located on table 18 utilizing knob 20 to frictionally engage the fence to the table. Blade 22 passes through an opening 24 in table 18 and is guided by guiding arm 26 thereabove. Band saw apparatus 12 is shown mounted on an upper lateral surface 28 of container 30. Drawer 32 is shown partially withdrawn from opening 34 in container 30. Dust 36 is shown accumulated in drawer 32. Handle 38 facilitates the withdrawal of drawer 32 from container 30. Motor 40 is coupled to the wheels, not shown, supporting blade 22.

Housing 42 is secured to surface 28 and is adapted with a drawer-like slide out filter element 44. Resilient rubber-like feet 46 are secured to lower lateral surface 48.

Figure 2:
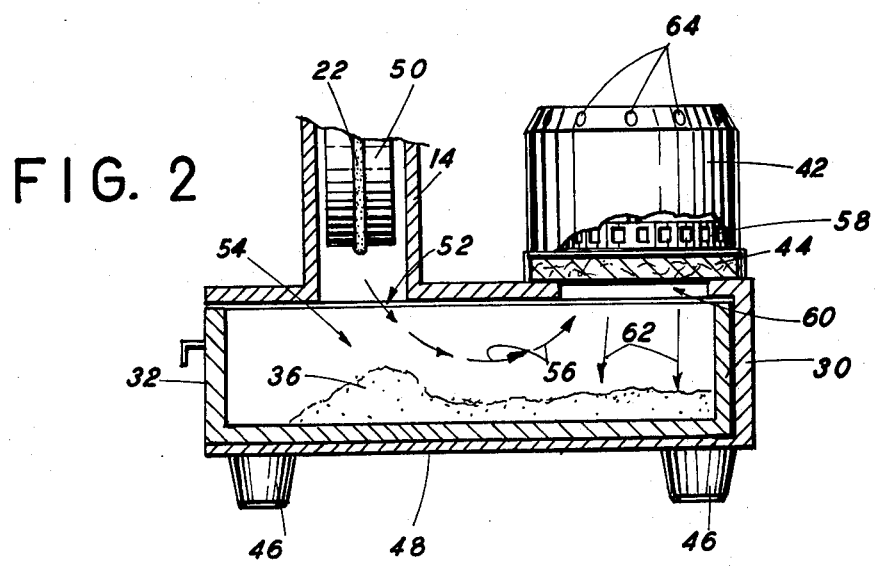
FIG. 2 is a side elevation partial cross-section view of the present invention.

FIG. 2 illustrates pulley 50 carrying circular shaped endless blade 22 thereon within housing 14. Opening 52 communicates to the interior portion 54 of container 30 so as to allow dust particles contained within enclosure 14 to travel in the directions of arrows 56. Housing 42 is shown containing blade element 58 disposed above dust filter 44. Dust filter 44 covers opening 60 in container 30 and communicates the less than atmospheric pressure generated by blower blade 58 into portion 54 of container 30. Dust, prevented from traveling into housing 42 by the filtering action of filter 44, descends in the directions of arrows 62 to be collected within drawer 32. Holes 64 communicate to the outside atmosphere by passing through the walls of housing 42, venting the interior portions of housing 42 thereby.

One of the advantages of the present invention is a compact band saw ceramic tile cutting device which substantially collects all of the dust created during the cutting process.

Another advantage of the present invention is a lightweight ceramic tile cutting device which operates with a minimum of noise, vibration, and ability to slide upon a supporting surface.

Still another advantage of the present invention is a dust collecting system which may be easily and conveniently emptied.

Yet another advantage of the present invention is a cutting apparatus which utilizes a circular cross-sectional endless blade so as to enable the user to cut tiles in any desired shape or pattern.

Thus there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. In a band saw cutting apparatus comprising a C-frame, a pair of wheels journalled to the C-frame, a cutting blade carried by the pair of wheels, the output shaft of a motor coupled to one of the wheels, the improvement comprising;
   a. a hollow container providing vertical support for the band saw cutting apparatus,
   b. a blower motor fixedly secured to the container having a blade assembly secured to a shaft thereof, a housing enclosing the blower motor and the blade, said container having a first opening therein, the first opening communicating to the housing, a filter being disposed removably secured covering the first opening,
   c. a drawer, the drawer being slideably affixed to the container, the drawer having an open mouth portion disposed above the marginal edges of the side wall thereof, the container having a second opening in the walls thereof, the second opening being disposed adjacent a lowermost one of said pair of wheels and above said drawer, the first opening of said container being located adjacent the second opening and covering a portion of said drawer, and
   d. a resilient material fixedly secured to a portion of the exterior surface of the container.

2. The improvement as claimed in claim 1 wherein said filter being slideably engaged to the housing being disposed passing through an opening in the housing.

3. The improvement as claimed in claim 1 wherein said blade assembly comprises an endless flexible belt having a circular cross-section, the exterior surface of the belt being disposed impregnated with an abrasive material.

4. The improvement as claimed in claim 3 wherein said abrasive material comprises silicon carbide.

5. The improvement as claimed in claim 1 wherein said container is provided with an upper and lower lateral surface disposed in spaced apart parallel relationship, said cutting apparatus and said housing being disposed fixedly secured to said upper lateral surface, said resilient material being disposed secured to said lower lateral surface.

6. The improvement as claimed in claim 5 wherein said drawer is slideably disposed intermediate said upper and lower lateral surfaces, said second opening being disposed substantially normal to said upper and lower lateral surfaces.

* * * * *